(12) United States Patent
Jin et al.

(10) Patent No.: US 12,223,338 B2
(45) Date of Patent: Feb. 11, 2025

(54) ROBOTIC PROCESS AUTOMATION SYSTEM AND METHOD ACROSS OPERATING SYSTEMS

(71) Applicant: DATAGRAND INFORMATION TECHNOLOGY (SHANGHAI) CO., LTD., Shanghai (CN)

(72) Inventors: Ke Jin, Shanghai (CN); Wanjun Shao, Shanghai (CN); Yunwen Chen, Shanghai (CN); Daqi Ji, Shanghai (CN); Wei Jiao, Shanghai (CN); Yulue Wang, Shanghai (CN)

(73) Assignee: DATAGRAND CO., LTD., Shanghai (CN)

( * ) Notice: Subject to any disclaimer, the term of this patent is extended or adjusted under 35 U.S.C. 154(b) by 0 days.

(21) Appl. No.: 18/032,002

(22) PCT Filed: Oct. 18, 2022

(86) PCT No.: PCT/CN2022/125801
§ 371 (c)(1),
(2) Date: Apr. 14, 2023

(87) PCT Pub. No.: WO2023/151303
PCT Pub. Date: Aug. 17, 2023

(65) Prior Publication Data
US 2024/0264852 A1 Aug. 8, 2024

(30) Foreign Application Priority Data
Feb. 9, 2022 (CN) .................... 202210119825.X (51) Int. Cl.
*G06F 9/44* (2018.01)
*G06F 9/455* (2018.01)

(52) U.S. Cl.
CPC ............... *G06F 9/45508* (2013.01)

(58) Field of Classification Search
CPC ............................................. G06F 9/44
See application file for complete search history.

(56) References Cited

U.S. PATENT DOCUMENTS

| 11,258,846 B1* | 2/2022 | Mokshagundam | ..... G06F 16/27 |
| 2005/0216507 A1* | 9/2005 | Wright | ................... G06Q 10/10 |

(Continued)

FOREIGN PATENT DOCUMENTS

| CN | 111311185 A | 6/2020 |
| CN | 114579091 A | 6/2022 |
| WO | 2021133254 A1 | 7/2021 |

OTHER PUBLICATIONS

Shao Wanjun, "Daguan Data is the first to launch the industry's only RPA robot that is compatible with all operating systems", Jan. 6, 2020; <https://mp.weixin.qq.com/s/XRS9u7G23fp0xhLdNh_4og>.

*Primary Examiner* — Jae U Jeon
(74) *Attorney, Agent, or Firm* — Lando & Anastasi, LLP (57) ABSTRACT

Provided are a robotic process automation system and method across operating systems. The system includes an automation process development platform, a control center, and a robot. The automation process development platform is configured to design a corresponding automation business process according to a business scenario requirement, translate the automation business process into a corresponding process code, perform cross-platform encapsulation on the process code, and package the encapsulated cross-platform process code and send the encapsulated cross-platform process code to the control center. The control center is configured to schedule the robot deployed in different operating systems to execute the automation business process corresponding to the cross-platform process code. The robot is configured to download the cross-platform process code to a local operating system, call a process parser of a corresponding category to perform process parsing on the cross- (Continued)

platform process code, and execute the parsed automation business process.

20 Claims, 4 Drawing Sheets

(56) References Cited

U.S. PATENT DOCUMENTS

| | | | |
|---|---|---|---|
| 2009/0282077 A1* | 11/2009 | Thomas | G06F 16/40 |
| 2019/0188116 A1* | 6/2019 | Roth | G06F 11/3608 |
| 2020/0180148 A1 | 6/2020 | S Nanal et al. | |
| 2020/0348964 A1 | 11/2020 | Anand et al. | |
| 2020/0387358 A1 | 12/2020 | Chae | |
| 2021/0149648 A1 | 5/2021 | Velammal et al. | |

* cited by examiner

ROBOTIC PROCESS AUTOMATION SYSTEM AND METHOD ACROSS OPERATING SYSTEMS

CROSS-REFERENCE TO RELATED APPLICATIONS

This application is a U.S. national phase application and claims the benefit of priority under 35 U.S.C. § 371, of International (PCT) Patent Application Serial No. PCT/CN2022/125801, filed on Oct. 18, 2022, which claims priority to Chinese Patent Application No. 202210119825.X, filed on Feb. 9, 2022, the disclosures of which are incorporated herein by reference in their entireties.

TECHNICAL FIELD

The present application relates to the technical field of software engineering, for example, a robotic process automation system and method across operating systems.

BACKGROUND

Robotic process automation (RPA) software runs on a personal computer or a server. A main function of the software is to simulate human to manipulate various types of system software and automatically execute a business process. The software is suitable for large-scale and highly repetitive business scenarios.

Various types of business software are used in different industries and can run on different operating systems (OSs), including Windows, Linux, Mac, and domestic operating systems in China. Workflow and automation technologies used by the RPA software mostly rely on the technology architecture of Microsoft OS and the RPA software is difficult to run on platforms other than Windows.

SUMMARY

The present application provides a robotic process automation system across operating systems. The robotic process automation system across operating systems includes an automation process development platform, a control center, and a robot.

The automation process development platform is developed based on a running environment across operating systems and configured to design a corresponding automation business process according to a business scenario requirement, translate the automation business process into a corresponding process code, perform cross-platform encapsulation on the process code, and package the encapsulated cross-platform process code and send the encapsulated cross-platform process code to the control center.

The control center is developed based on a programming language runnable across operating systems and configured to schedule the robot deployed in different operating systems to execute the automation business process corresponding to the cross-platform process code.

The robot is developed based on the programming language runnable across operating systems and configured to download the cross-platform process code to a local operating system, call a process parser of a corresponding category according to a category of the local operating system to perform process parsing on the cross-platform process code, and execute the parsed automation business process.

The present application provides a robotic process automation method across operating systems, which is applied to the robotic process automation system across operating systems. The method includes the steps described below.

The automation process development platform of the system designs a corresponding visual automation business process according to the business scenario requirement.

The automation process development platform translates the automation business process into the corresponding process code.

The automation process development platform encapsulates the process code into the cross-platform process code through a cross-platform software development kit (SDK).

The automation process development platform packages the cross-platform process code and sends the cross-platform process code to the control center of the system.

The control center schedules the robot deployed in different operating systems of the system to execute the automation business process corresponding to the cross-platform process code.

The robot downloads the cross-platform process code to the local operating system as planned.

The robot calls the process parser of the corresponding category according to the category of the local operating system where the robot is located.

The robot parses the cross-platform process code through the process parser.

The robot calls, through the process parser, a cross-platform SDK-related application programming interface (API) referenced by the cross-platform process code so that the API automatically operates corresponding system software.

DETAILED DESCRIPTION

The technical solutions of the present application are described below in conjunction with drawings and embodiments.

Figure 1:
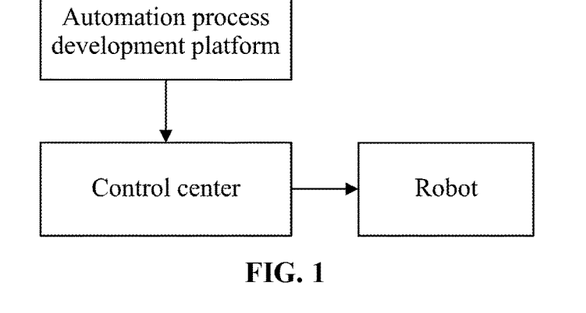
FIG. 1 is a schematic block diagram illustrating a robotic process automation system across operating systems according to an embodiment of the present application.

As shown in FIG. 1, a robotic process automation system across operating systems provided in an embodiment of the present application includes an automation process development platform, a control center, and a robot. The automation process development platform is developed based on a running environment across operating systems and configured to design a corresponding automation business process according to a business scenario requirement, translate the automation business process into a corresponding process code, perform cross-platform encapsulation on the process code, and package the encapsulated cross-platform process code and send the encapsulated cross-platform process code to the control center. The control center is developed based on a programming language runnable across operating systems and configured to schedule the robot deployed in different operating systems to execute the automation business process corresponding to the cross-platform process code. The robot is developed based on the programming language runnable across operating systems and configured to download the cross-platform process code to a local operating system, call a process parser of a corresponding category according to a category of the local operating system to perform process parsing on the cross-platform process code, and execute the parsed automation business process.

Figure 2:
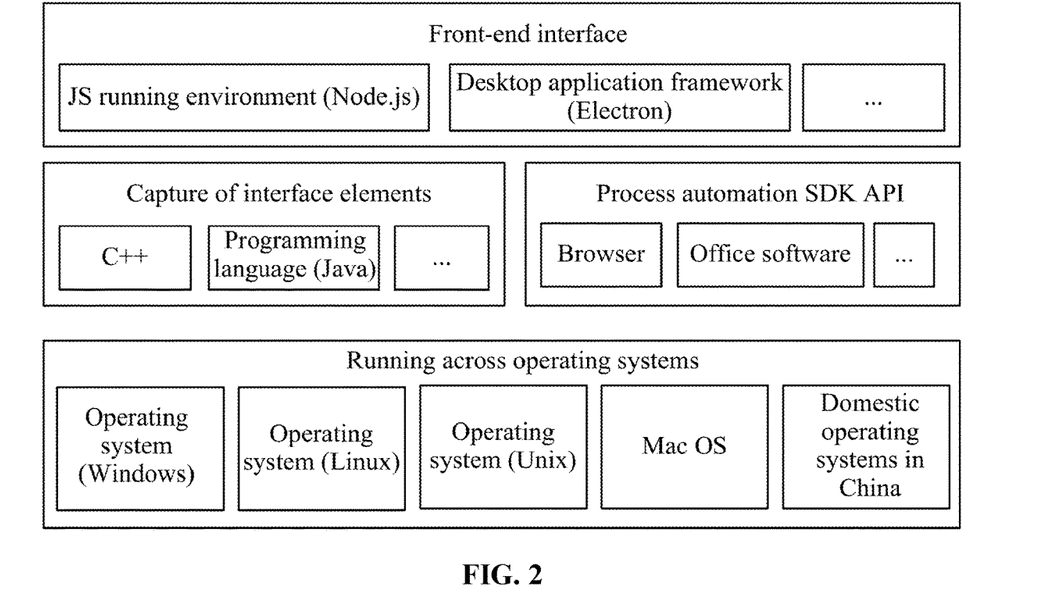
FIG. 2 is a schematic block diagram illustrating an automation process development platform according to an embodiment of the present application.

In an embodiment, the automation process development platform includes a first front-end interface module, a first process automation software development kit (SDK), and a first underlying service module. The first front-end interface module is configured for human-computer interaction. The first process automation SDK is a cross-platform SDK configured to provide a functional support for the process code to manipulate other software. The first underlying service module is configured to support the first process automation SDK to run on multiple operating systems.

In an embodiment, the first front-end interface module is developed based on Node.js and Electron.

In an embodiment, the first process automation SDK is developed based on Python language.

In an embodiment, the first underlying service module is developed based on C++ language and Java language.

Figure 3:
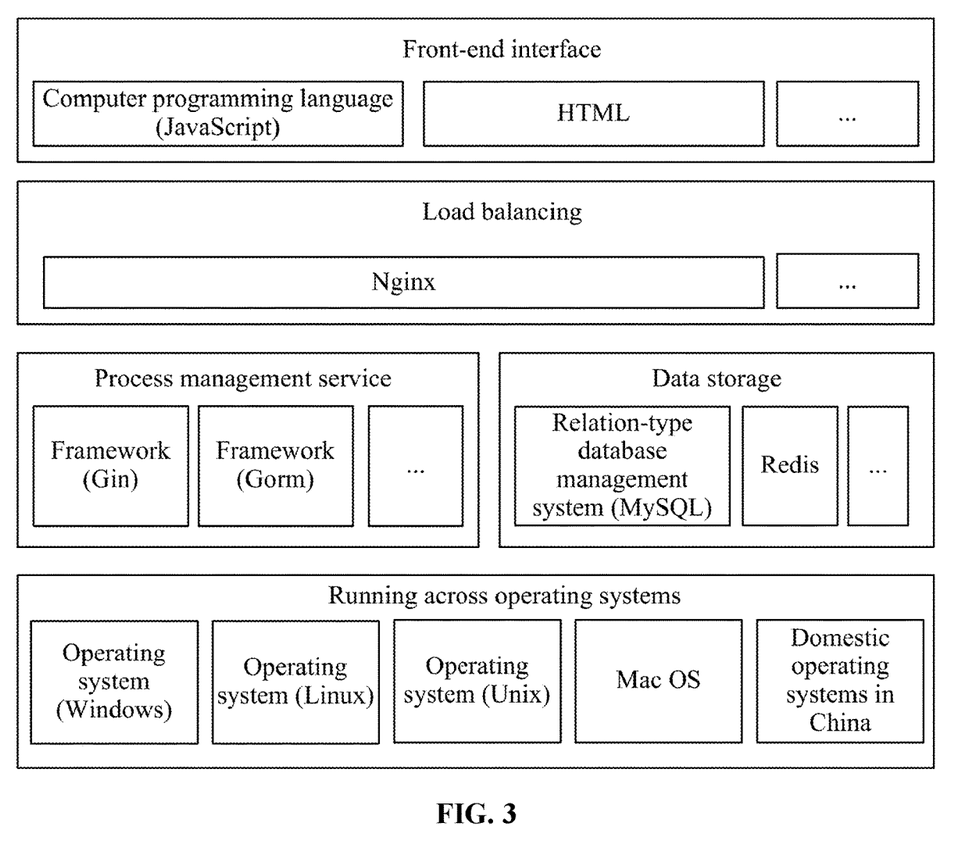
FIG. 3 is a schematic block diagram illustrating a control center according to an embodiment of the present application.

In an embodiment, the control center includes a second front-end interface module, a background service module, and a data storage module. The second front-end interface module is configured for human-computer interaction. The background service module is configured for load balancing and process management. The data storage module is configured to store a process, data, and an operational result.

In an embodiment, the second front-end interface module is developed based on JavaScript and Hyper Text Markup Language (HTML).

In an embodiment, the background service module is developed based on GoLang language, and configured to achieve the load balancing through Nginx, and achieve the process management through the Web framework Gin and the database connection framework Gorm.

In an embodiment, the data storage module stores the data in My Structured Query Language (MySQL) database and Remote Dictionary Server (Redis) database.

Figure 4:
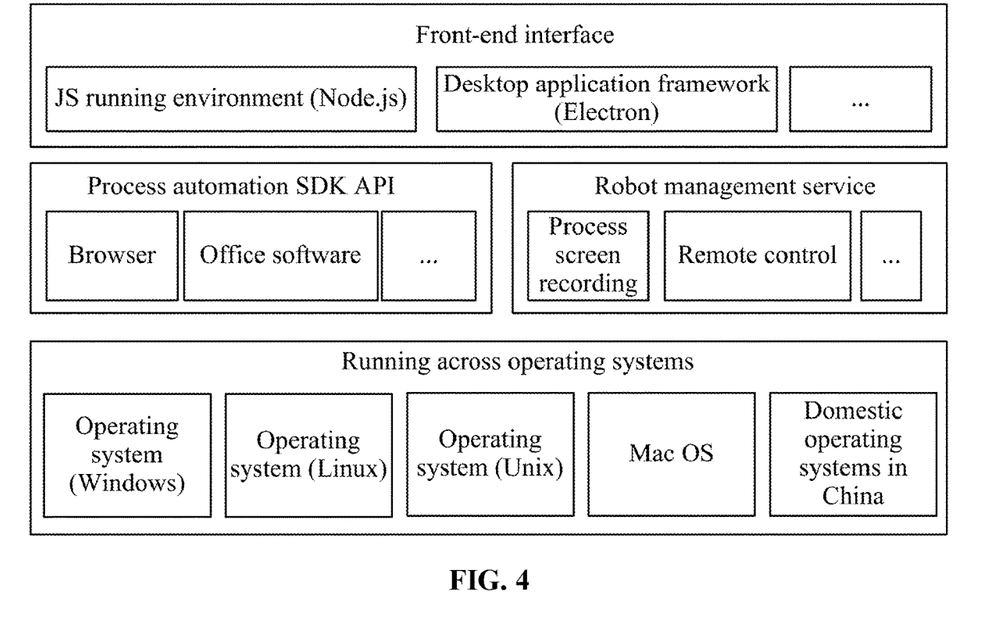
FIG. 4 is a schematic block diagram illustrating a robot according to an embodiment of the present application.

In an embodiment, the robot includes a third front-end interface module, a second process automation SDK, and a second underlying service module. The third front-end interface module is configured for human-computer interaction. The second process automation SDK is configured to provide a functional support for the process code to manipulate other software.

The second underlying service module is configured to support the second process automation SDK to run on multiple operating systems.

In an embodiment, the third front-end interface module is developed based on the Node.js.

In an embodiment, the second process automation SDK is developed based on the Python language.

Figure 5:
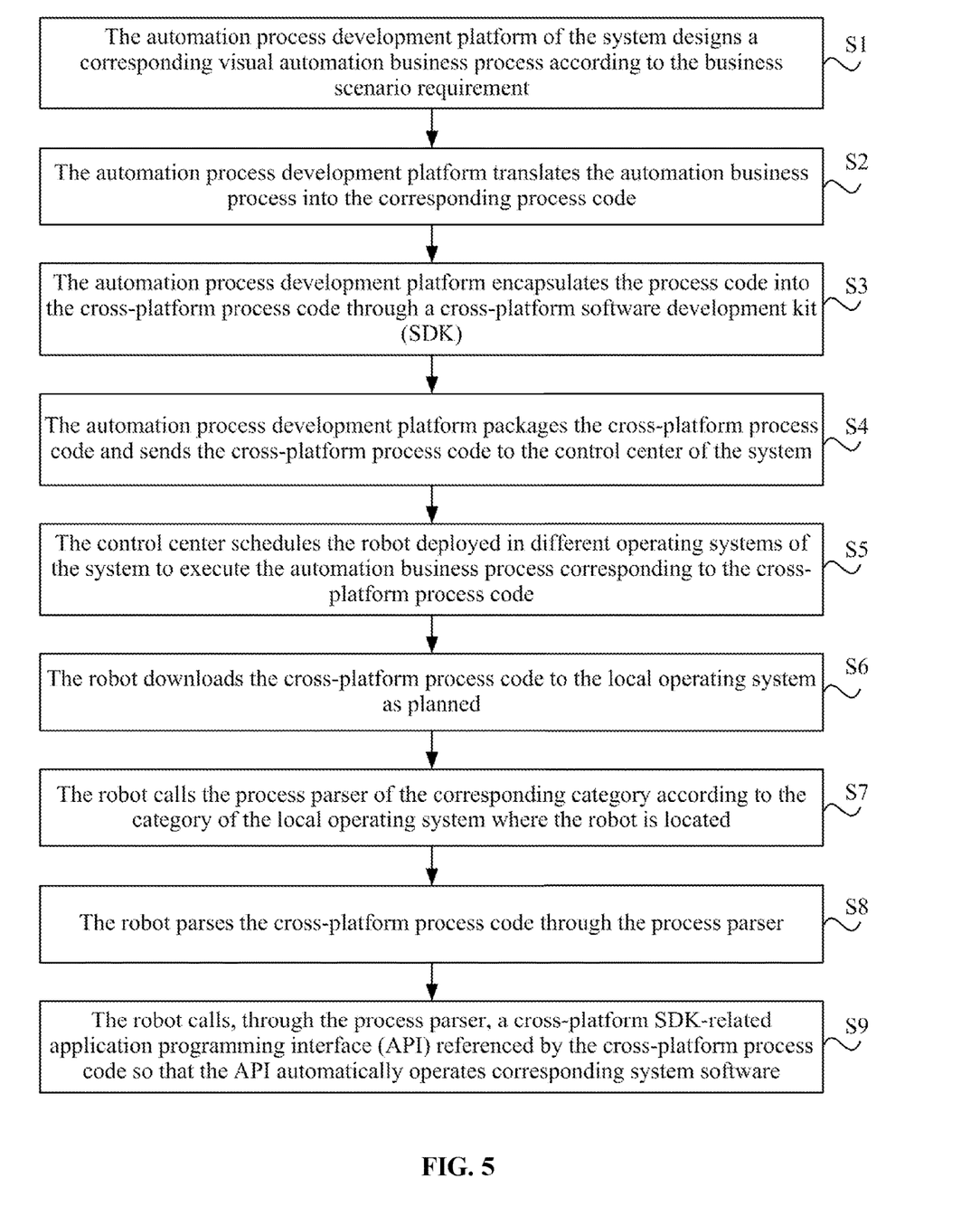
FIG. 5 is a flowchart of a robotic process automation method across operating systems according to an embodiment of the present application.

As shown in FIG. 5, the present application provides a robotic process automation method across operating systems applied to the robotic process automation system across operating systems. The method includes the steps described below.

In S1, the automation process development platform of the system designs a corresponding visual automation business process according to the business scenario requirement.

In S2, the automation process development platform translates the automation business process into the corresponding process code.

In S3, the automation process development platform encapsulates the process code into the cross-platform process code through a cross-platform software development kit (SDK).

In S4, the automation process development platform packages the cross-platform process code and sends the cross-platform process code to the control center of the system.

In S5, the control center schedules the robot deployed in different operating systems of the system to execute the automation business process corresponding to the cross-platform process code.

In S6, the robot downloads the cross-platform process code to the local operating system as planned.

In S7, the robot calls the process parser of the corresponding category according to the category of the local operating system where the robot is located.

In S8, the robot parses the cross-platform process code through the process parser.

In S9, the robot calls, through the process parser, a cross-platform SDK-related application programming interface (API) referenced by the cross-platform process code so that the API automatically operates corresponding system software.

The present application provides an implementation method for robotic process automation (RPA) across operating systems, aiming to solve the problem that RPA cannot be installed and run on all operating systems. Through a cross-platform software architecture based on technologies such as GoLang, Python, and JavaScript (JS), an underlying service, a front-end interface, and an automation process are deployed and run across platforms, so as to achieve a complete cross-platform RPA software system.

One: the cross-platform robotic automation process mainly relies on the encapsulation and parsing of a cross-platform SDK.

1, development platforms deployed on different operating systems is configured to design corresponding automation processes according to the business scenario requirement. The processes are translated into codes and then encapsulated into processes runnable on different operating systems through the cross-platform SDK.

2, the control center is configured to receive processes released by the development platforms and schedule robots disposed on different operating systems to execute process tasks.

3, the robots deployed on different operating systems are configured to download the processes to the local system, parse the process codes and run the pared process codes through the cross-platform SDK, so as to complete the automatic manipulation of business systems on multiple platforms.

Two: RPA software consists of three parts, including the automation process development platform, the control center, and the robot.

1, Implementation Solution of the Automation Process Development Platform Across Systems (1) A front-end interface: the front-end interface is developed based on Node.js and Electron, and Node.js and Electron are runnable across platforms.

(2) Process automation SDK: the SDK is developed based on the Python language, where the Python language is installable and runnable on different operating systems. The SDK includes operating APIs for many types of software systems. An user can send automation instructions to the software systems (such as a browser and Office) through the APIs on different operating systems.

(3) Underlying service: technologies such as automatic capture of interface elements of the process development platform are developed based on C++ language and Java language and runnable across platforms.

2, Implementation Solution of the Automation Process Control Center Across Systems (1) Front-end interface: the front-end interface is developed based on web technologies such as JavaScript and HTML and runnable on different operating systems.

(2) Background service: the background service is developed based on the GoLang language, in which the highly extensible Web framework Gin and the excellent database connection framework Gorm are used, and the service uses Nginx to achieve load balancing. Both Gin and Gorm are runnable on different operating systems.

(3) Data storage: data is stored in the MySQL database and Redis, and MySQL and Redis are runnable on multiple types of operating systems.

3, Implementation Solution of the Automation Process Robot Across Systems (1) Front-end interface: the front-end interface is developed based on the Node JS language, and Node.js is a cross-platform JavaScript running environment.

(2) Process automation SDK: the SDK is developed based on the Python language, where the Python language is installable and runnable on different operating systems. The SDK includes operating APIs for many types of software systems. An user can send automation instructions to the software systems (such as a browser and Office) through the APIs on different operating systems.

(3) Underlying service: a robot management service of a process robot includes process execution process screen recording, robot remote desktop control, and the like. Related services are runnable across platforms.

Manners across operating systems are described below.

1, Processes Developed on the Windows System Run on Windows System and Linux System.

Deployment of a control center on Windows 10: the control center is quickly deployed and installed on the Win 10 system, a management service is started, and an access request is monitored.

Deployment of a development platform on Windows 10: one-touch installation of the development platform on the Win 10 system is achieved, and connection to the control center is achieved using a connection control center function after the program is started.

Deployment of a robot on Windows 10 and Redhat 7.5 (Linux): one-touch installation of the robot on Win 10 and Redhat 7.5 systems is achieved, and connection to the control center is achieved using the connection control center function after the program is started.

So far, the three parts can communicate with each other and operate normally. The user designs an automation process of Web-side business system manipulation on the development platform deployed by Windows, where the automation process may be released to robots on Windows and Linux through the control center for execution.

2, Processes Developed on the Linux System Run on Windows and Linux Systems.

Deployment of a control center on Linux: the control center is deployed and installed on the Linux system using the Docker technology, a management service is started, and an access request is monitored.

Deployment of a development platform on Linux: one-touch installation of the development platform on the Linux system is achieved, and connection to the control center is achieved using the connection control center function after the program is started.

Deployment of a robot on Redhat 7.5 and Windows 10: one-touch installation of the robot on Redhat 7.5 and Win 10 systems is achieved, and connection to the control center is achieved using the connection control center function after the program is started.

So far, the three parts can communicate with each other and operate normally. The user designs an automation process of Web-side business system manipulation on the development platform deployed by Linux, where the automation process may be released to robots on Windows and Linux through the control center for execution.

The present application adopts a technical framework based on languages such as GoLang, Python, and JS, is compatible with Windows, Linux, Mac OS, domestic operating systems in China, and the like, solves the difficult problem that traditional RPA cannot be deployed across platforms, and achieves the cross-platform deployment and operation of the underlying service, the front-end interface, and the automation process, thereby achieving the cross-platform of the complete RPA software system and greatly expanding application scenarios of the RPA software system. Based on the RPA across operating systems, the automation process across operating systems can be designed and is directly runnable on different operating systems without redesign. With the development of domestic operating system substitution trend in China, there are more and more business scenarios of the domestic operating systems in China in the future, a large number of Windows platform business processes are migrated, and the migration costs of the cross-platform RPA system are lower. A cross-platform solution based on mainstream language technology has better scalability and stability.

The present application is described with reference to flowcharts and/or block diagrams of a system, a method, and a computer storage medium according to the embodiments of the present application. It is to be understood that the computer program instructions can be used to implement each flow and/or block in the flowcharts and/or block diagrams and a combination of flows and/or blocks in the flowcharts and/or block diagrams. These computer program instructions can be provided to a general-purpose computer, a special-purpose computer, an embedded processor or a processor of other programmable data processing equipment to produce a machine so that instructions executed by a computer or the processor of other programmable data processing equipment produce a means for implementing functions specified in one or more flows in the flowcharts and/or one or more blocks in the block diagrams.

These computer program instructions can also be stored in a computer-readable memory which can direct the computer or other programmable data processing equipment to operate in a particular manner so that the instructions stored in the computer-readable memory produce a manufactured product including an instruction means. The instruction means implements the functions specified in one or more flows in the flowcharts and/or one or more blocks in the block diagrams.

These computer program instructions can also be loaded onto the computer or other programmable data processing equipment so that a series of operation steps are performed on the computer or other programmable equipment to produce processing implemented by the computer. Therefore, instructions executed on the computer or other programmable equipment provide steps for implementing the functions specified in one or more flows in the flowcharts and/or one or more blocks in the block diagrams.

What is claimed is:

1. A robotic process automation system across operating systems, comprising an automation process development platform, a control center, and a robot;
   wherein the automation process development platform is developed based on a running environment across operating systems and configured to design a corresponding automation business process according to a business scenario requirement, translate the automation business process into a corresponding process code, perform cross-platform encapsulation on the process code, and package the encapsulated cross-platform process code and send the encapsulated cross-platform process code to the control center;
   the control center is developed based on a programming language runnable across operating systems and configured to schedule the robot deployed in different operating systems to execute the automation business process corresponding to the cross-platform process code; and
   the robot is developed based on the programming language runnable across operating systems and configured to download the cross-platform process code to a local operating system, call a process parser of a corresponding category according to a category of the local operating system to perform process parsing on the cross-platform process code, and execute the parsed automation business process.

2. The robotic process automation system across operating systems of claim 1, wherein the automation process development platform comprises a first front-end interface module, a first process automation software development kit (SDK), and a first underlying service module;
   wherein the first front-end interface module is configured for human-computer interaction;
   the first process automation SDK is a cross-platform SDK configured to provide a functional support for the process code to manipulate other software; and
   the first underlying service module is configured to support the first process automation SDK to run on a plurality of operating systems.

3. The robotic process automation system across operating systems of claim 2, wherein the first front-end interface module is developed based on Node.js and Electron.

4. The robotic process automation system across operating systems of claim 2, wherein the first process automation SDK is developed based on Python language.

5. The robotic process automation system across operating systems of claim 2, wherein the first underlying service module is developed based on C++ language and Java language.

6. The robotic process automation system across operating systems of claim 1, wherein the control center comprises a second front-end interface module, a background service module, and a data storage module;
   wherein the second front-end interface module is configured for human-computer interaction;
   the background service module is configured for load balancing and process management; and
   the data storage module is configured to store a process, data, and an operational result.

7. The robotic process automation system across operating systems of claim 6, wherein the second front-end interface module is developed based on JavaScript and Hyper Text Markup Language (HTML).

8. The robotic process automation system across operating systems of claim 6, wherein the background service module is developed based on GoLang language, and configured to achieve the load balancing through Nginx, and achieve the process management through Web framework Gin and database connection framework Gorm.

9. The robotic process automation system across operating systems of claim 6, wherein the data storage module is configured to store the data in My Structured Query Language (MySQL) database and Remote Dictionary Server (Redis) database.

10. The robotic process automation system across operating systems of claim 1, wherein the robot comprises a third front-end interface module, a second process automation SDK, and a second underlying service module;
    wherein the third front-end interface module is configured for human-computer interaction;
    the second process automation SDK is configured to provide a functional support for the process code to manipulate other software; and
    the second underlying service module is configured to support the second process automation SDK to run on a plurality of operating systems.

11. The robotic process automation system across operating systems of claim 10, wherein the third front-end interface module is developed based on Node.js.

12. The robotic process automation system across operating systems of claim 10, wherein the second process automation SDK is developed based on Python language.

13. A robotic process automation method across operating systems, the method applied to a robotic process automation system across operating systems, and the robotic process automation system across operating systems comprises an automation process development platform, a control center, and a robot; wherein the robotic process automation method across operating systems comprises:
    designing, by the automation process development platform, a corresponding visual automation business process according to a business scenario requirement;
    translating, by the automation process development platform, the automation business process into the corresponding process code;
    encapsulating, by the automation process development platform, the process code into the cross-platform process code through a cross-platform software development kit (SDK);
    packaging, by the automation process development platform, the cross-platform process code, and sending, by the automation process development platform, the cross-platform process code to the control center of the system;
    scheduling, by the control center, the robot deployed in different operating systems of the system to execute the automation business process corresponding to the cross-platform process code;
    downloading, by the robot, the cross-platform process code to the local operating system as planned;

calling, by the robot, a process parser of the corresponding category according to the category of the local operating system where the robot is located;

parsing, by the robot, the cross-platform process code through the process parser; and calling, by the robot through the process parser, a cross-platform SDK-related application programming interface (API) referenced by the cross-platform process code so that the API automatically operates corresponding system software.

14. The robotic process automation method across operating systems of claim 13, wherein the automation process development platform comprises a first front-end interface module, a first process automation software development kit (SDK), and a first underlying service module;

wherein the first front-end interface module is configured for human-computer interaction;

the first process automation SDK is a cross-platform SDK configured to provide a functional support for the process code to manipulate other software; and the first underlying service module is configured to support the first process automation SDK to run on a plurality of operating systems.

15. The robotic process automation method across operating systems of claim 14, wherein the first front-end interface module is developed based on Node.js and Electron.

16. The robotic process automation method across operating systems of claim 14, wherein the first process automation SDK is developed based on Python language.

17. The robotic process automation method across operating systems of claim 14, wherein the first underlying service module is developed based on C++ language and Java language.

18. The robotic process automation method across operating systems of claim 13, wherein the control center comprises a second front-end interface module, a background service module, and a data storage module;

wherein the second front-end interface module is configured for human-computer interaction;

the background service module is configured for load balancing and process management; and the data storage module is configured to store a process, data, and an operational result.

19. The robotic process automation method across operating systems of claim 18, wherein the second front-end interface module is developed based on JavaScript and Hyper Text Markup Language (HTML).

20. The robotic process automation method across operating systems of claim 18, wherein the background service module is developed based on GoLang language, and configured to achieve the load balancing through Nginx, and achieve the process management through Web framework Gin and database connection framework Gorm.

* * * * *